Oct. 6, 1959 L. J. MANN 2,907,180
REFRIGERATING APPARATUS HAVING AIR CONTROL MEANS
FOR MULTIPLE COMPARTMENTS
Filed Oct. 19, 1956 2 Sheets-Sheet 2

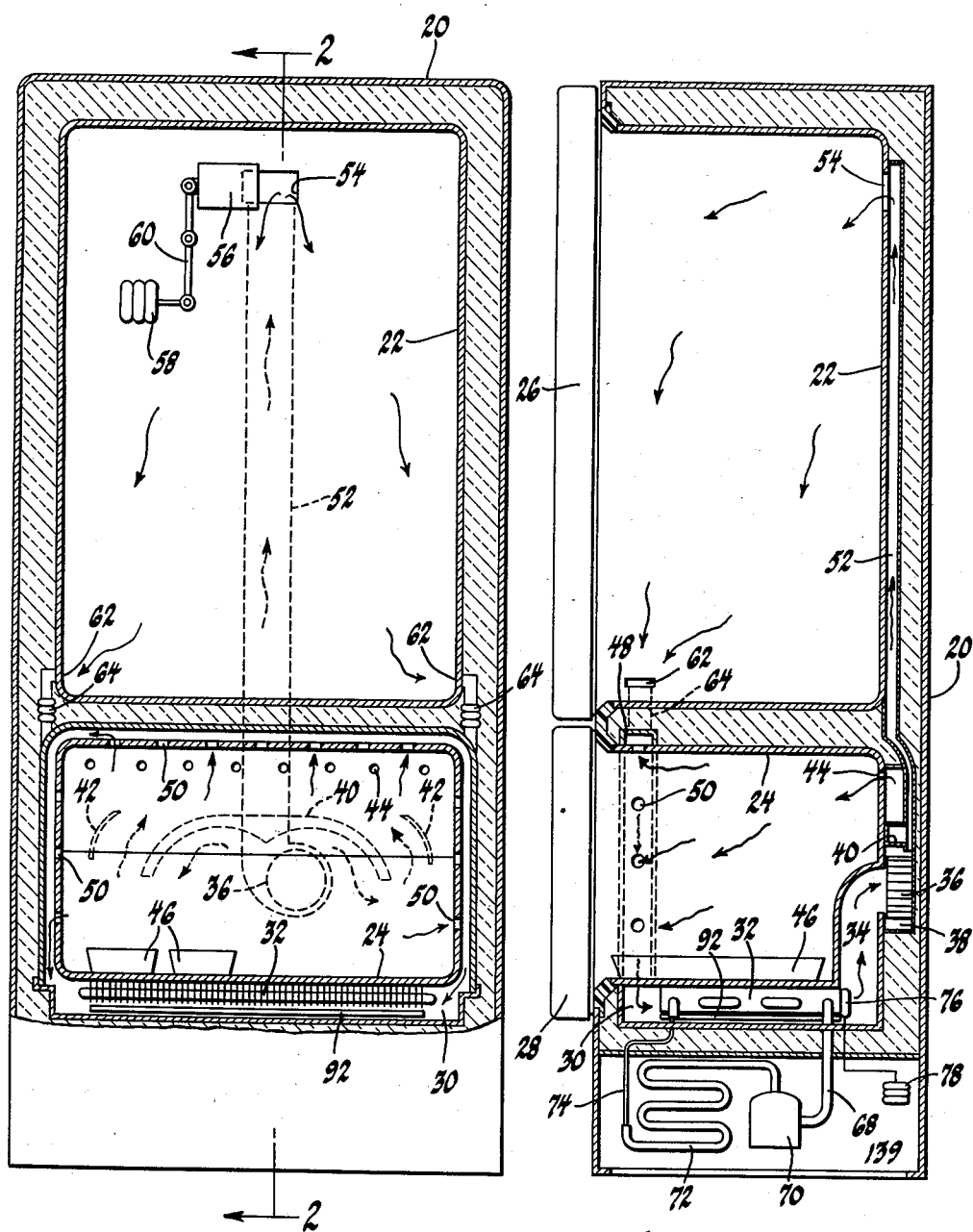

INVENTOR.
Leonard J. Mann
BY Edwin S. Dybvig
HIS ATTORNEY

United States Patent Office 2,907,180
Patented Oct. 6, 1959

2,907,180

REFRIGERATING APPARATUS HAVING AIR CONTROL MEANS FOR MULTIPLE COMPARTMENTS

Leonard J. Mann, Dayton, Ohio, assignor to General Motors Corporation, Detroit, Mich., a corporation of Delaware Application October 19, 1956, Serial No. 617,170

10 Claims. (Cl. 62—155)

This invention relates to refrigerating apparatus and more particularly to household refrigerators provided with separate frozen storage and above freezing food compartments.

The frosting of household refrigerators has been very troublesome. A great many types of defrosting systems have been provided some of which have been automatic but all appear to have some objectionable characteristics. The frost results from the freezing of moisture vapor on surfaces maintained at below freezing temperatures. Ordinarily the humidity in a food compartment is too high in summer if the cooling surfaces are operated continuously above freezing temperatures to avoid frosting. The frozen storage compartment of necessity must operate at about 0° F. resulting in heavy frosting of the cold surfaces particularly in the summer time.

It is an object of this invention to provide a cooling arrangement for a frozen storage compartment providing rapid ice freezing and low temperatures which will also normally prevent the formation of frost therein and will sublime any occasional frost formation.

It is another object of this invention to treat air in such a manner and to circulate such air through a frozen storage compartment so that frosting normally will be prevented and any occasional frost formed will be sublimed shortly after its formation while the bottom of the compartment has sufficient refrigeration for fast ice freezing.

These and other objects are obtained in the form of the invention shown in the drawings in which an insulated household refrigerant cabinet is provided with box-shaped freezing and food compartment liners located one above the other with the sole evaporator located beneath and in contact with the bottom of the freezing liner. Air is drawn through air exit apertures around the front of the frozen storage compartment liner adjacent the door into a collar which discharges into an air circulating passage containing the evaporator extending directly beneath this liner. The rear of this passage is connected by an upwardly extending passage to a fan located at the rear of the frozen storage liner. This fan discharges the cooled air into a passage provided with deflectors causing a circulation of the cold air behind the rear wall of the frozen storage liner until it reaches entrance apertures in the top rear of the liner.

During this movement of the air at the rear of the liner, the air picks up heat both from the liner and the adjacent insulated wall of the cabinet to lower its relative humidity. By the time the air enters the frozen storage compartment its temperature has been raised and its relative humidity lowered sufficiently that frost formation will normally be prevented within the frozen storage compartment. Any occasional frosting occurring when the door is open will be sublimed by this circulating air. A portion of the air circulating at the rear of the frozen storage compartment liner is taken to the "up" portion of the food storage compartment and circulated therein to cool the storage compartment under the control of a thermostatically operated valve. The single evaporator is connected to a compression refrigerating system and is provided with electric heat or hot gas defrosting for rapidly defrosting the evaporator.

Further objects and advantages of the present invention will be apparent from the following description, reference being had to the accompanying drawing, wherein a preferred form of the present invention is clearly shown.

In the drawings:

Figure 1 is a vertical sectional view through a household refrigerator embodying one form of my invention;

Figure 2 is a sectional view taken substantially along the lines 2—2 of Figure 1;

Figure 3:
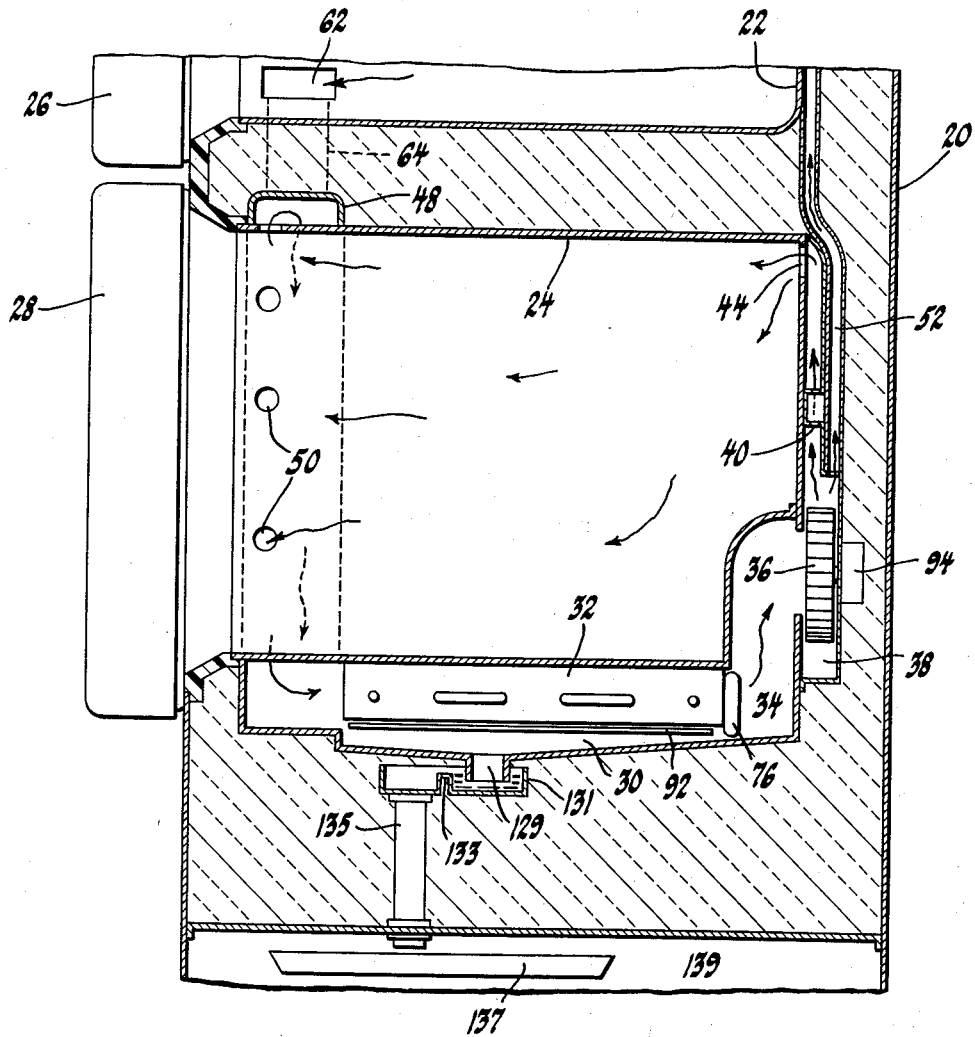
Figure 3 is an enlarged sectional view of the frozen storage compartment shown in Figure 2.
Figure 4:
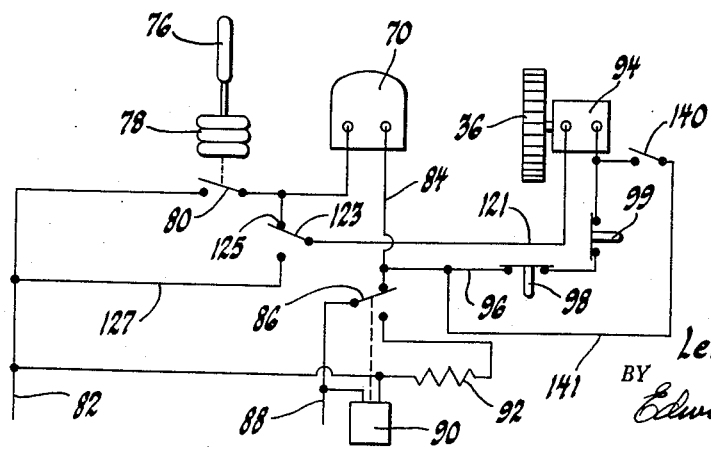
Figure 4 is a wiring diagram of the electrical system.

Referring now to the drawings and more particularly to Figures 1 and 2 there is shown an insulated refrigerator cabinet 20 provided with an upper box-shaped liner 22 enclosing the above freezing food storage compartment and below it a smaller box-shaped liner 24 enclosing a frozen storage compartment. These liners are surrounded by heat insulation and provided with outer doors 26 and 28.

The frozen storage compartment 24 has beneath it a horizontal air circulating passageway 30 within which is located the refrigerant evaporating means 32. This refrigerant evaporation means 32 includes tubing arranged in serpentine fashion provided with transverse vertical parallel fins extending from the front to the rear. The tops of the fins preferably are bonded or otherwise firmly held against the bottom of the liner 24 of the frozen food compartment. At the rear of the liner 24 is a vertical passageway 34 connecting with the central inlet of the centrifugal fan 36.

The centrifugal fan 36 is located in the air circulating passage 38 extending upwardly and over the rear face of the rear wall of the liner 24. The passageway 38 is provided with the curved deflector 40 directly above the fan 36 so as to direct the air downwardly and outwardly over the rear face of the rear wall of the liner 24. The rear wall is also provided with a second set of deflectors 42 for distributing the flow of air after the air passes around the ends of the deflector 40. The air in passing through the passage 38 receives heat from the rear wall of the liner as well as heat which enters through the rear wall of the cabinet 20. This air flow passage is purposely made long so that the air will absorb more heat. This heat raises the temperature of the air and thus reduces its relative humidity. The rise in temperature and the reduction in the relative humidity is sufficient that when the air passes from the passage 38 through the air entrance apertures 44 extending across the upper portion of the rear wall of the liner 24, the air is dry enough that it will not form frost within the liner 24 and will sublime and thereby remove any frost which may occasionally form within the liner 24 when the door 28 is opened.

The bottom of the liner 24 may be provided with several ice trays 46 which may rapidly freeze water therein by virtue of the direct contact of the fins of the evaporator 32 with the bottom of the liner 24 upon which rests these trays. The liner 24 also may have stored therein frozen foods of many different types. There is a collar 48 extending around the front edge of the top and sides of the liner 24. The lower ends of this collar 48 discharges into the front sides of the bottom air passage 30. The liner 24 is provided with a series of apertures 50 extending across the top and sides of the liner 24 providing distributed exits directly to the collar 48.

Directly above the fan 36 there is also provided a vertical air passage 52 which connects to an opening 54 in the upper portion of the rear wall of the liner 22. A portion of the air is discharged by the fan 36 directly through the passage 52 and the aperture 54 into the interior of the food compartment liner 22. The flow of air is controlled by a damper 56 which covers and uncovers a greater or lesser portion of the aperture 54 according to decreases or increases of the temperature within the food compartment 22. For this purpose there is indicated diagramatically within the compartment 22 a temperature responsive bellows 58 which through lever 60 operates the damper 56 to control the flow of air. The food compartment liner 22 is provided with outlets 62 at the front of each side which are connected by flexible air ducts 64 to the upper corner portions of the collar 48. Only a relatively small amount of air flows through the food compartment 22. The volume of air flow is such as to keep the humidity therein at a proper level, such as 75 percent. The air flows downwardly through the aperture 62, conduits 64 and the collar 48 to the front end of the passage 30.

The evaporator 32 is connected by the suction line 68 with a sealed motor compressor unit 70. This motor compressor unit discharges into the condenser 72 which condenses the compressed refrigerant and conducts it through the capillary tube 74 back into the evaporator 32. The sealed motor compressor unit 70 is controlled by a thermostat bulb 76 located at the rear edge of the evaporator 32. This thermostat bulb 76 is connected by a capillary tube to the flexible metal bellows 78 opening and closing the switch 80 connected in series between the sealed motor compressor unit 70 and the supply conductor 82.

The second terminal of the sealed motor compressor unit is connected by the conductor 84 to the single pole double throw switch 86. This switch is normally in the up position connecting the conductor 84 with the supply conductor 88. At suitable times, the switch 86 is moved to its lower position by a time clock 90 or other suitable device. At such times the switch 86 is lowered to connect the supply conductor 88 with the electric heater 92 which is also connected to the supply conductor 82. The heater 92 is located directly beneath the evaporator 32 and may be in the form of a rigid or flexible sheet or it may be of a sheathed tubular type. When the switch 86 is lowered by the time clock 90 to energize the heater 92, the sealed motor compressor unit 70 is deenergized. At the same time the motor 94 which drives the fan 36 is deenergized. This is done by connecting to the conductor 84 the conductor 96 through the door switches 98 and 99 to the motor 94. One of door switches 98 or 99 opens with either door 26 or 28. The second terminal of the motor 94 is connected by the conductor 121 to the common terminal of the double throw switch 123. This switch 123 has one stationary contact 125 connected to the conductor extending between the switch 80 and the sealed unit 70 so that the fan 36 will cycle with the sealed unit 70 when the switch 123 is in this upper position. When the switch 123 is in the lower position, it connects with the conductor 127 providing a direct connection with the supply conductor 82. In this position the fan motor 94 is continuously energized regardless of the operation of the switch 80 and the cycling of the sealed unit 70. The fan 36 under this condition is only stopped by the opening of one or both of the door switches 98 or 99 or the lowering of the switch 86 to the defrosting position.

A shunt circuit 141 is provided with a manually operable switch 140 for shunting the door switches 98 and 99. When switch 140 is closed the door switches 98 and 99 are by passed and the fan motor 94 will operate regardless of the door positions. When switch 140 is opened, the fan motor 94 will be controlled by the switches 98 and 99.

By this simple air cooling arrangement frosting of the frozen storage compartment and the food compartment are substantially prevented and eliminated.

During the defrosting period, the melted frost will be collected in the bottom of the passage 30 and discharged through the spout 129 into the receptacle 131. This receptacle 131 is divided by overflow dam 133. Upon the opposite side of the dam 133 from the spout 129, the receptacle 131 is provided with a drain tube 135 which discharges into a wide shallow pan 137 located in the machine compartment 139 where it receives heat from the condenser 72 and the motor compressor unit 70 in amounts sufficient to cause evaporation of the melted frost water from the pan 137 at rates sufficient to keep the pan from overflowing. The dam 133 provides a water seal at the bottom of the spout 129 so that air will not be drawn up from the machine compartment 139 through the discharge tube 135 into the passageway 30.

It will be seen that the entire system is relatively simple and inexpensive and yet provides fast freezing by reason of the evaporator 32 being directly beneath the tray 46. It also keeps both compartments substantially free from frost. The frost on the evaporator 32 is never seen. It also defrosts the evaporator 32 in such a way that the defrost water resulting from the melting of the frost is never seen by the housewife. An accumulation of ice on food packages in the liner 24 is eliminated.

While the form of embodiment of the invention as herein disclosed constitutes a preferred form, it is to be understood that other forms might be adopted, as may come within the scope of the claims which follow.

What is claimed is as follows:

1. A household refrigerator including an insulated cabinet containing an unfrozen food compartment liner and a frozen food compartment liner located outside of and insulated from but adjacent to the unfrozen food compartment liner, said cabinet having a horizontal air passage directly beneath and contacting the bottom of said frozen food compartment liner, a refrigerant evaporating means located entirely in said horizontal air passage and having upright fins extending into direct contact with the bottom of said frozen food compartment liner, the bottom of said frozen food compartment liner being adapted to support an ice tray, said cabinet having a first upward air passage extending along the outer surface of said frozen food compartment liner, said frozen food compartment liner having an opening communicating with said first upward air passage to receive air therefrom, said cabinet having a second upward air passage extending to said unfrozen food compartment liner, said unfrozen food compartment liner having an opening communicating with said second upward air passage to receive air therefrom, a fan having its inlet operatively connected to and drawing air from said horizontal air passage on one side of said evaporating means and having its outlet operatively connected to and delivering air to both said first and second upward air passages, said cabinet also having return air passages extending from the interiors of said frozen and unfrozen food compartment liners to said horizontal air passage on the other side of said evaporating means, and means for restricting the circulation of air through said second upward air passage and said unfrozen food compartment to said return air passage sufficiently to prevent below freezing temperatures therein.

2. A household refrigerator including an insulated cabinet containing an unfrozen food compartment liner and a frozen food compartment liner located outside of and insulated from but adjacent to the unfrozen food compartment liner, said cabinet having a horizontal air passage directly beneath and contacting the bottom of said frozen food compartment liner, a refrigerant evaporating means located entirely in said horizontal air passage and having upright fins extending into direct contact with the bottom of said frozen food compartment liner, the bottom of said frozen food compartment liner being adapted to support an ice tray, said cabinet having a first upward air passage extending along the outer surface of said frozen food compartment liner, said frozen food compartment liner having an opening communicating with said first upward air passage to receive air therefrom, said cabinet having a second upward air passage extending to said unfrozen food compartment liner, said unfrozen food compartment liner having an opening communicating with said second upward air passage to receive air therefrom, a fan having its inlet operatively connected to and drawing air from said horizontal air passage on one side of said evaporating means and having its outlet operatively connected to and delivering air to both said first and second upward air passages, said cabinet being provided with door openings and doors for access to the interiors of said liners, said cabinet having a first return air passage extending about the top and sides of the door opening for the frozen food compartment liner having inlets communicating with the top and sides of the door opening and the interior of the frozen food compartment liner and having an outlet at a lower end communicating with said horizontal air passage on the other side of said evaporating means, said cabinet having a second return air passage extending from the interior of said unfrozen food compartment to said first return air passage.

3. A household refrigerator including an insulated cabinet containing an unfrozen food compartment liner and a frozen food compartment liner located outside of and insulated from but adjacent to the unfrozen food compartment liner, said cabinet having a horizontal air passage directly beneath and contacting the bottom of said frozen food compartment liner, a refrigerant evaporating means located entirely in said horizontal air passage and having upright fins extending into direct contact with the bottom of said frozen food compartment liner, the bottom of said frozen food compartment liner being adapted to support an ice tray, said cabinet having a first upward air passage extending along the outer surface of said frozen food compartment liner, said frozen food compartment liner having an opening communicating with said first upward air passage to receive air therefrom, said cabinet having a second upward air passage extending to said unfrozen food compartment liner, said unfrozen food compartment liner having an opening communicating with said second upward air passage to receive air therefrom, a fan having its inlet operatively connected to and drawing air from said horizontal air passage on one side of said evaporating means and having its outlet operatively connected to and delivering air to both said first and second upward air passages, said cabinet also having return air passages extending from the interiors of said frozen and unfrozen food compartment liners to said horizontal air passage on the other side of said evaporating means, and thermostatic control means responsive to the temperature within said unfrozen food compartment for controlling the flow of air from said second upward air passage into said unfrozen food compartment.

4. A household refrigerator including an insulated cabinet containing an unfrozen food compartment liner and a frozen food compartment liner located outside of and insulated from but adjacent to the unfrozen food compartment liner, said cabinet having a horizontal air passage directly beneath and contacting the bottom of said frozen food compartment liner, a refrigerant evaporating means located entirely in said horizontal air passage and having upright fins extending into direct contact with the bottom of said frozen food compartment liner, the bottom of said frozen food compartment liner being adapted to support an ice tray, said cabinet having a first upward air passage extending along the outer surface of said frozen food compartment liner, said frozen food compartment liner having an opening communicating with said first upward air passage to receive air therefrom, said cabinet having a second upward air passage extending to said unfrozen food compartment liner, said unfrozen food compartment liner having an opening communicating with said second upward air passage to receive air therefrom, a fan having its inlet operatively connected to and drawing air from said horizontal air passage on one side of said evaporating means and having its outlet operatively connected to and delivering air to both said first and second upward air passages, said cabinet also having return air passages extending from the interiors of said frozen and unfrozen food compartment liners to said horizontal air passage on the other side of said evaporating means, valve means for controlling the flow of air from said second upward air passage into said unfrozen food compartment, and thermostatic control means for controlling said valve means.

5. A household refrigerator including an insulated cabinet containing an unfrozen food compartment liner and a frozen food compartment liner located one above the other and insulated from each other, said cabinet having a horizontal air passage located directly beneath and contacting the bottom of said frozen food compartment liner, said unfrozen and frozen food compartment liners each having a rear wall with an opening in the upper portion, said cabinet having an upright air passage extending along the rear wall of each of said liners to the respective openings therein, a refrigerant evaporating means located entirely in said horizontal passage and having upright fins extending into direct contact with the bottom of said frozen food compartment liner, fan means for drawing air from said horizontal air passage on one side of said evaporating means and discharging the air into said upright air passages, said liners each having a side wall with an opening therein, said cabinet having an upright air passage extending along one of said side walls from said openings therein to said horizontal air passage on the other side of said evaporating means.

6. A household refrigerator including an insulated cabinet containing a liner enclosing a food storage compartment, said liner being open at the front and having side and rear and top and bottom walls, insulated door means closing the front opening of said liner, said cabinet having a first air passageway beneath said liner and a second air passageway extending across the top and down along the sides of said liner adjacent the front thereof, said second passageway having restricted openings opening into and providing communication with the interior of said storage compartment along the top and sides of said liner and at its lower end opening into and discharging into said first passageway, the rear wall of said liner having entrance openings, said cabinet having a third air passageway extending from said first passageway along said rear wall to said entrance openings, refrigerant evaporating means located in said first passageway between said second and third passageways, and fan means for circulating air from said compartment and second passageway through said evaporating means and said first and third passageways to said compartment.

7. A household refrigerator including an insulated cabinet containing a frozen food compartment, an evaporating means located outside said frozen food compartment, an electrically operated fan means for circulating air from said frozen food compartment into heat transfer relationship with said evaporating means to cool said air and thence returning the cooled air to said frozen food compartment, an electrically operated refrigerant liquefying means operatively connected to said evaporating means, a thermostatic switch responsive to the temperature of said evaporating means connected in series circuit with said liquefying means and providing an electrical connection with a power supply subject to said thermostatic switch, a double throw switch means having its common terminal electrically connected to said fan means and having one alternate terminal electrically connected in series with said thermostatic switch and in parallel circuit with said liquefying means and the second alternate terminal electrically connected in shunt with said thermostatic switch and providing a connection with a power supply independent of said thermostatic switch.

8. A household refrigerator including an insulated cabinet containing an unfrozen food compartment and a frozen food compartment insulated from each other, one of said compartments having an enclosing wall, a single evaporating means associated and in cooling relation with an enclosing wall portion of one of said compartments for cooling the unfrozen food compartment at above freezing temperatures and for cooling the frozen food compartment at below freezing temperatures including fan and duct means for drawing air from said freezing compartment outside thereof into heat transfer relation with said single evaporating means outside said freezing compartment and thence returning the cold dry air to said freezing compartment, means for periodically defrosting said single evaporating means, and means for stopping the operation of said fan means during said periodic defrosting.

9. A household refrigerator including an insulated cabinet containing an unfrozen food compartment and a frozen food compartment insulated from each other, one of said compartments having an enclosing wall, a single evaporating means associated and in cooling relation with an enclosing wall portion of one of said compartments for cooling the unfrozen food compartment at above freezing temperatures and for cooling the frozen food compartment at below freezing temperatures including fan and duct means for circulating cold dry air from the rear to the front of said freezing compartment and thence outside thereof into heat transfer relation with said single evaporating means and thence returning the cold dry air to said freezing compartment, means for periodically defrosting said single evaporating means, and means for stopping the operation of said fan means during said periodic defrosting.

10. A household refrigerator including an insulated cabinet containing a frozen food compartment and an unfrozen food compartment insulated from each other, evaporating means for cooling said compartments, fan and duct means for circulating air through said compartments into heat transfer relation with said evaporating means and again through said compartments for maintaining the unfrozen food compartment at above freezing temperatures and the frozen food compartment at freezing temperatures, separate door means for said frozen and unfrozen food compartments, and means responsive to the opening of either of said door means for controlling said fan means.

References Cited in the file of this patent

UNITED STATES PATENTS

| 2,285,946 | Kalischer | June 9, 1942 |
| 2,442,719 | Booth | June 1, 1948 |
| 2,458,048 | Bauman | Jan. 4, 1949 |
| 2,679,731 | Zearfoss | June 1, 1954 |
| 2,774,225 | Grilley et al. | Dec. 18, 1956 |
| 2,792,691 | Murphy et al. | May 21, 1957 |